US012559318B2

(12) United States Patent
Bianco et al.

(10) Patent No.: US 12,559,318 B2
(45) Date of Patent: Feb. 24, 2026

(54) AUTOMATED WAREHOUSE PROVIDED WITH REFRIGERATORS

(71) Applicant: ICAM S.R.L., Putignano (IT)

(72) Inventors: Roberto Bianco, Putignano (IT); Graziano Bianco, Putignano (IT); Leonardo Antonio Veccaro, Putignano (IT); Lorenzo Domenico Mastrangelo, Putignano (IT)

(73) Assignee: ICAM S.R.L., Putignano (IT)

( * ) Notice: Subject to any disclaimer, the term of this patent is extended or adjusted under 35 U.S.C. 154(b) by 350 days.

(21) Appl. No.: 18/031,311

(22) PCT Filed: Oct. 15, 2021

(86) PCT No.: PCT/IB2021/059524
§ 371 (c)(1),
(2) Date: Apr. 11, 2023

(87) PCT Pub. No.: WO2022/079687
PCT Pub. Date: Apr. 21, 2022

(65) Prior Publication Data
US 2024/0017925 A1      Jan. 18, 2024

(30) Foreign Application Priority Data

Oct. 15, 2020     (IT) ........................ 102020000024376

(51) Int. Cl.
B65G 1/137          (2006.01)
F25D 13/04          (2006.01)

(52) U.S. Cl.
CPC ........... B65G 1/1378 (2013.01); F25D 13/04 (2013.01)

(58) Field of Classification Search
CPC ...... B65G 1/04; B65G 1/1373; B65G 1/1378; G07F 9/105; F25D 13/04
See application file for complete search history.

(56) References Cited

U.S. PATENT DOCUMENTS 8,983,647 B1 *   3/2015   Dwarakanath ....... G05D 1/0297
                                                700/216
2019/0246571 A1   8/2019   Ingram-Tedd et al.
(Continued)

FOREIGN PATENT DOCUMENTS

CN        109502220 A        3/2019
CN        111372872 A        7/2020
(Continued)

OTHER PUBLICATIONS

International Search Report and International Written Opinion in corresponding International Patent Application No. PCT/IB2021/059524, mailed Jan. 4, 2022, 9 pages.
(Continued)

*Primary Examiner* — Kaitlin S Joerger
(74) *Attorney, Agent, or Firm* — FisherBroyles, LLP

(57)          ABSTRACT

An automated warehouse has a plurality of loading units designed to carry respective articles accommodated in respective storage stations and transferred by a movement device to at least one picking/depositing station, which can be accessed, at least under given operating conditions, in order to retrieve/deposit the articles. At least two loading units are provided with respective refrigerators which communicate with a remote control device to send operating data and/or receive command signals. The loading units transporting the refrigerators are distinct from the latter, are powered to be supplied by an electrical network of the warehouse when they are arranged in corresponding storage stations, and are electrically connected to the respective refrigerators.

11 Claims, 6 Drawing Sheets

(56)              References Cited

U.S. PATENT DOCUMENTS

2020/0017302 A1 *  1/2020  Lindbo ................. C12C 11/006
2021/0380342 A1 *  12/2021  Wright ..................... G07F 9/105
2023/0028034 A1 *  1/2023  Gravelle ............. B65G 1/0485
2023/0243567 A1 *  8/2023  Brown ................. B65G 1/1378
                                                         62/129

FOREIGN PATENT DOCUMENTS

DE       102014101625  A1      8/2015
EP           2889233  A1      7/2015
JP         2012056659  A      3/2012

OTHER PUBLICATIONS

Chinese office action issued in Application No. 202180070493.4, dated Jun. 28, 2025.

* cited by examiner

AUTOMATED WAREHOUSE PROVIDED WITH REFRIGERATORS

CROSS-REFERENCE TO RELATED APPLICATIONS

This application is a United States National Stage Application of International Application No. PCT/IB2021/059524 filed Oct. 15, 2021, claiming priority from Italian Patent Application No. 102020000024376 filed on Oct. 15, 2020, the entire disclosure of which is incorporated herein by reference.

TECHNICAL FIELD

The invention relates to an automated warehouse provided with refrigerators.

BACKGROUND ART

Automated warehouses are normally provided with loading units, which generally have a series of compartments to contain and transport different articles.

Said loading units typically have, in plan view, a rectangular shape and can automatically be transferred, by means of motor-driven mechanisms, from and to at least one picking/depositing station. In this station, users manually operate from above, retrieving or depositing articles from or into the loading unit which has been transferred to the station. In some cases, the station is provided with a selective access device, also known as "selector", which closes the top of the space where the loading unit is transferred and is configured to allow access only to those compartments for which users have an authorization. In other words, the selector forbids non-authorized access to the other compartments of the loading unit arranged in the station.

For example, known selectors are door and/or shutter selectors.

In some cases, the stored articles need to be stored at given temperatures, namely under room temperature, in order to preserve them. For example, this need arises in case of food products and in case of some types of medications. In order to fulfil this need, warehouses are known, which have one or more inner refrigerated areas, each controlled so as to ensure a required temperature in a given environment and in the loading units located within said environment. For example, warehouses are known, which are provided with two or three inner refrigerated areas, which are separated from one another by sliding doors.

However, these solution are not satisfactory.

Indeed, if the warehouse has one single inner refrigerated area, there is a scarce flexibility in the management of the product preservation temperatures. As a matter of fact, the temperature is set to one single reference value, which is the same for all the articles stored inside, without possible differences.

Furthermore, these solutions require significant investments in order to insulate the walls and the structures of the warehouse delimiting the controlled-temperature environment and, generally speaking, they lead to significant operating energy consumptions, due to the need to condition the entire environment (and not only the loading units arranged inside it).

On the other hand, if the warehouse has several inner refrigerated areas at different temperature, a greater flexibility is obtained.

However, problems concerning the insulation of the structures as well as energy consumptions still remain. In addition, condensate generally tends to form in border zones between inner areas at different temperatures; and the desired temperature in each refrigerated area cannot always be ensured because of the inevitable mix of air volumes at the passages needed between different areas refrigerated at different temperatures.

In any case, even when there are different refrigerated areas inside the warehouse, the flexibility in managing temperatures is not ideal, since said areas are in a limited number (for example, there are two or three of them, as mentioned above).

In order to try and overcome this drawback, warehouses are known, in which each loading unit of the warehouse is a respective cooling unit, which can be transported between the picking/depositing station and a corresponding storage station inside the warehouse.

However, this type of solution also is scarcely satisfying because it requires a dedicated design to interface these cooling units with the support structures, with the moving devices and with the picking/depositing stations that have to be provided in the warehouses. Furthermore, since the cooling units are integrated in the loading units, the operations that have to be carried out for maintenance and/or replacement of these cooling units are relatively complex. For the same reason, solutions of this type do not allow users to easily and quickly increase and/or decrease the number of cooling units provided in the warehouse, for example in order to re-configure the handling of products in the warehouse itself.

Besides, in known solutions of this type, which entail several cooling units, handling the operation thereof in a flexible and reliable manner is relatively complicated.

DISCLOSURE OF INVENTION

Therefore, the object of the invention is to provide an automated warehouse, which overcomes the drawbacks discussed above in a simple and economic manner and, in particular, can be manufactured with a high degree of flexibility, so that it can store and handle a series of articles that require different preservation temperatures, if necessary together with articles that do not require any type of cooling in order to be correctly preserved in the warehouse.

According to the invention, an automated warehouse with refrigerators is provided, as defined in claim 1.

BRIEF DESCRIPTION OF THE DRAWINGS

The invention will now be described with reference to the accompanying drawings, which show a non-limiting embodiment thereof, wherein.

BEST MODE FOR CARRYING OUT THE INVENTION

Figure 1:
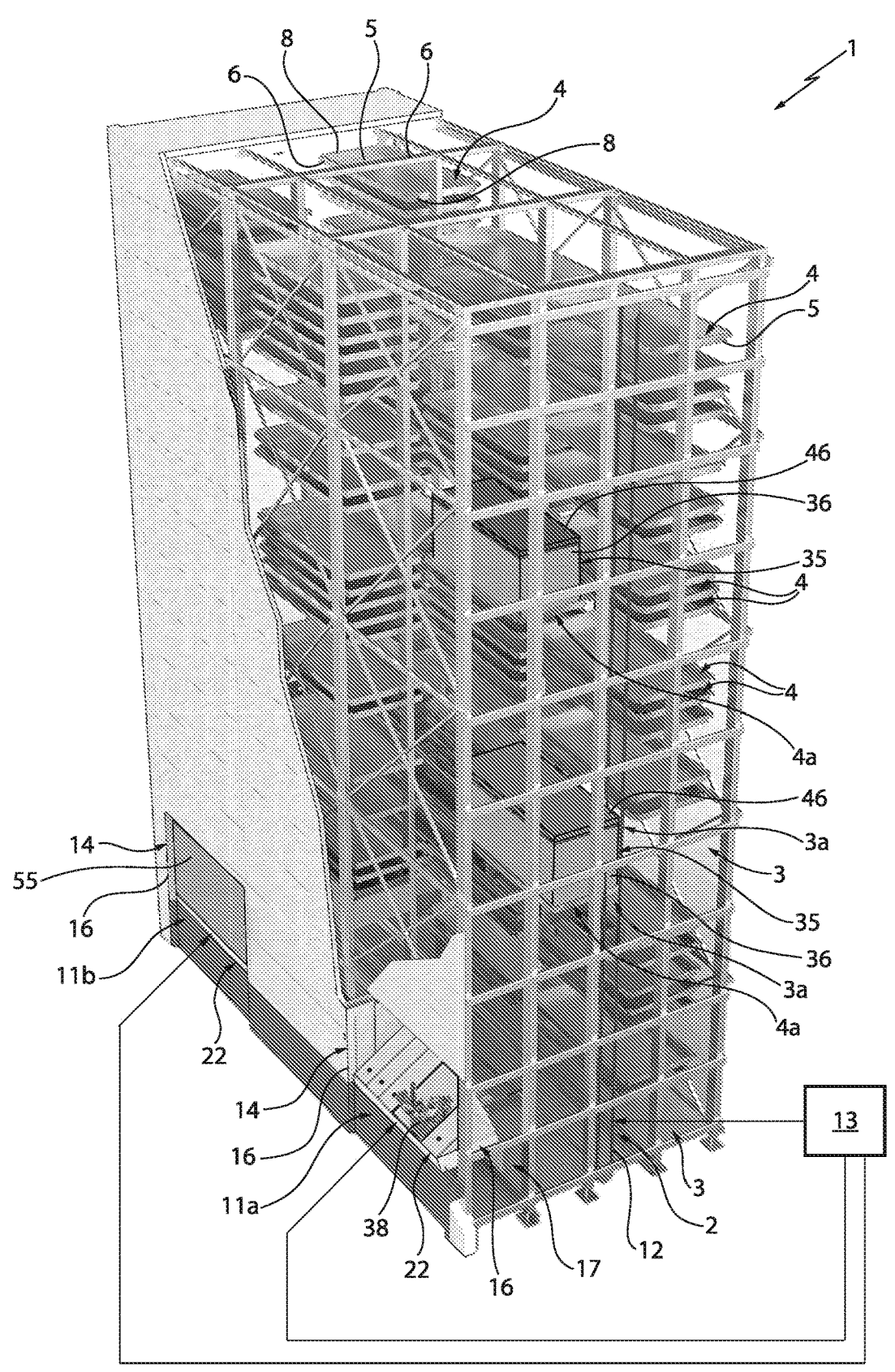
FIG. 1 is a perspective view, with parts removed for greater clarity, of a preferred embodiment of the automated warehouse provided with refrigerators according to the present invention.

In FIG. 1, reference number 1 indicates an automated warehouse comprising a fixed structure 2, which defines a plurality of storing stations 3 having dimensions that are such that they can each support and store a respective loading unit 4. In the example shown herein, the structure 2 has a vertical development of the multi-column type, but the invention also applies to warehouses with a horizontal development or of the single-column type.

The loading units 4 comprise respective containers, which are open at the top and are defined, for example, by trays (namely having a relatively low height).

Each loading unit 4 has a base 5 with a rectangular perimeter, which is defined by a pair of long sides 6 parallel to one another and by a pair of short sides 8 orthogonal to the long sides 6. According to a variant which is not shown herein, the loading units 4 have a substantially square base.

Figures 7, 8:
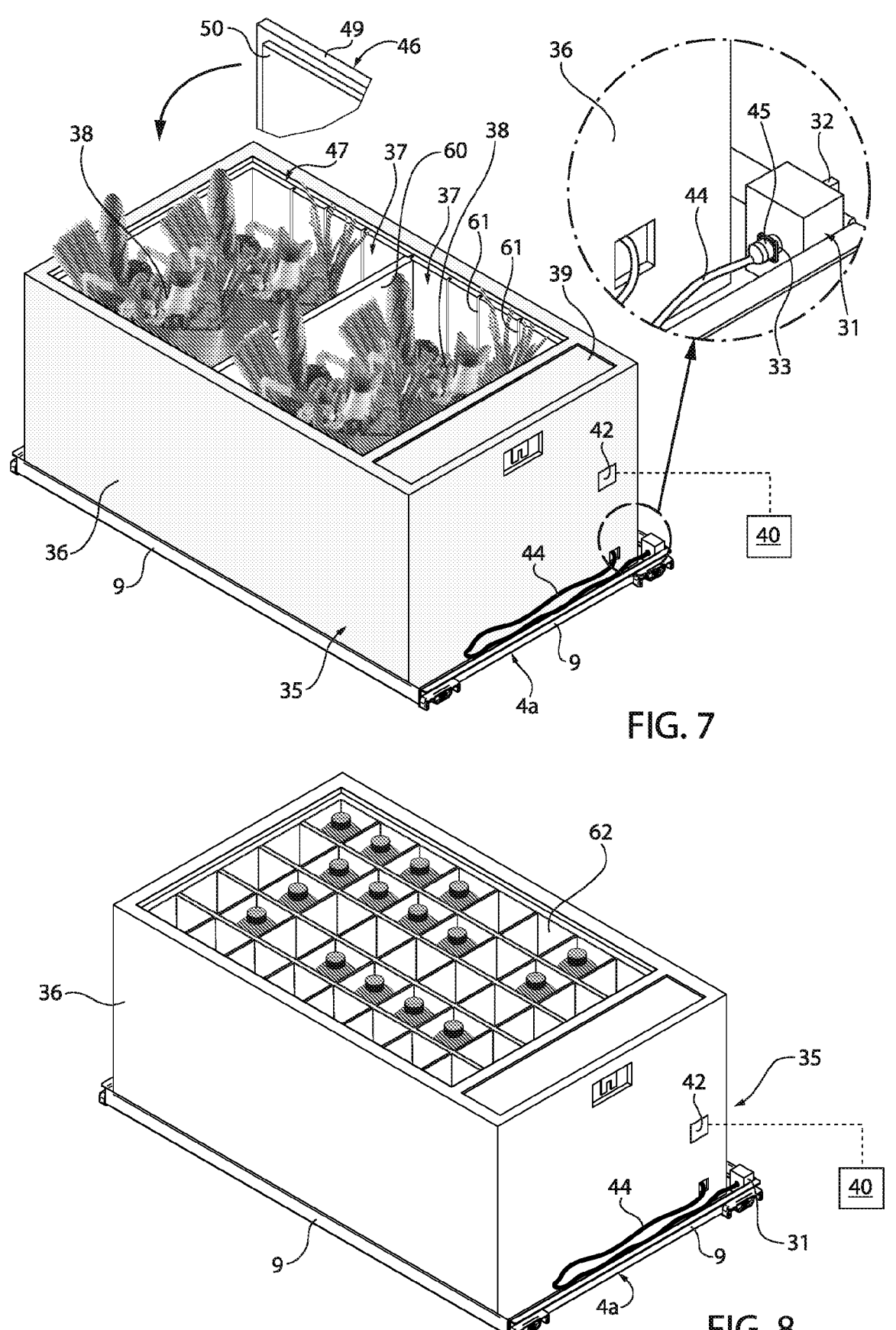
FIG. 7 shows, in a perspective view and on a larger scale, the loading unit provided with refrigerator shown in FIGS. 1-6.
FIG. 8 shows a variant of the refrigerator of FIG. 7.
Figure 9:
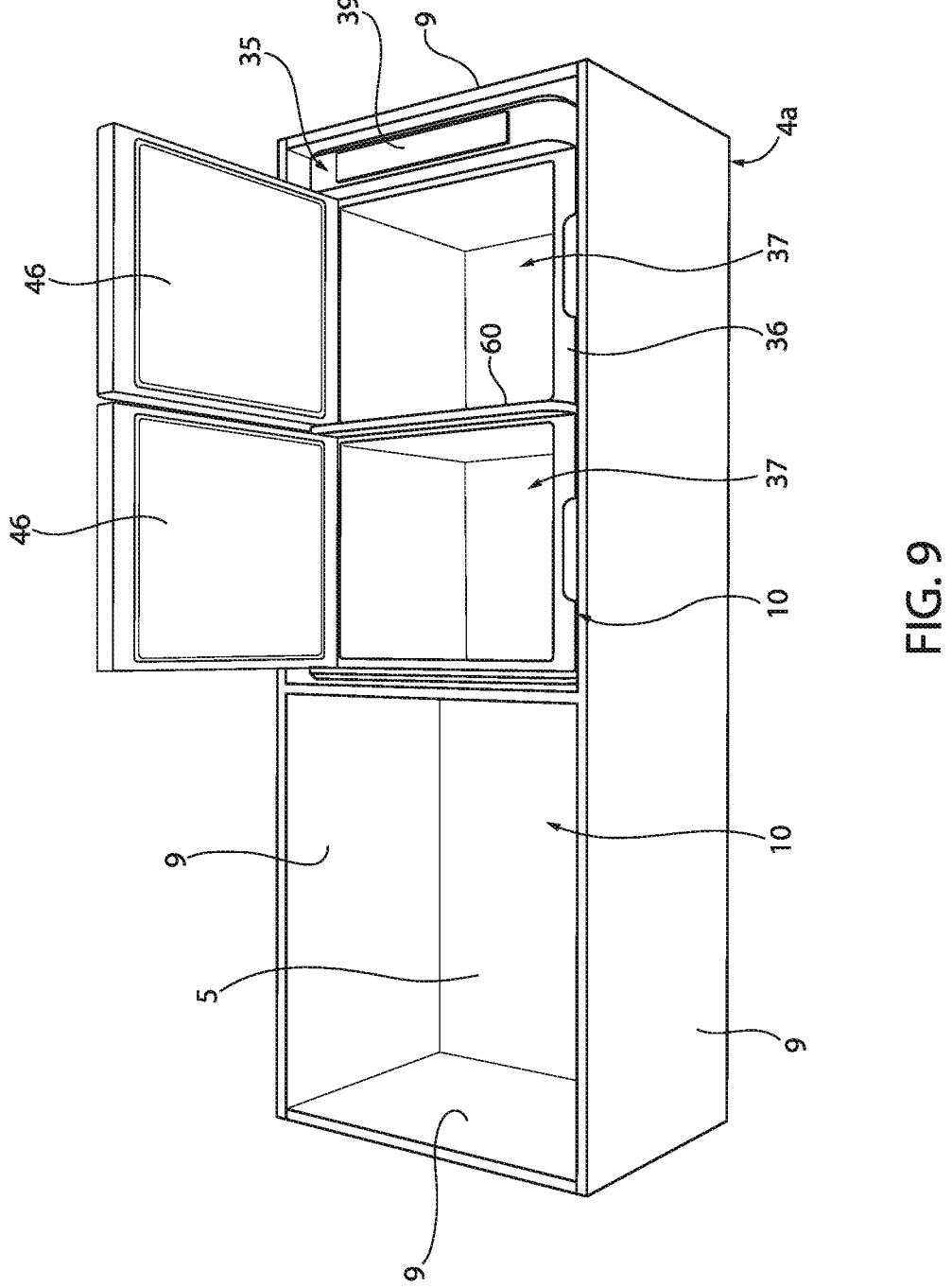
FIG. 9 shows other variants for the loading unit and the refrigerator.

According to FIG. 7, side boards 9 project upwards from the sides of the base 5. With reference to FIG. 9, the loading unit 4 can have one or more inner walls or partitions, which divide the area of the base 5 and, hence, the total transported volume, into different sectors or compartments 10, for example in order to transport and store different articles.

Preferably, it is possible to use loading units that already are normally manufactured. The only variable factors, if any, are defined by the division into possible compartments 10 and/or by the height of the side boards 9.

According to FIG. 1, the warehouse 1 further comprises one or more picking/depositing stations, specifically indicated by reference numbers 11a and 11b. The stations 11a,11b define respective points of access to the warehouse 1, since they allow one or more users to retrieve articles from the loading units 4 and/or to deposit articles into said loading units 4.

In the specific example shown herein, the articles stored in the warehouse 1 are food products. However, the description also applies to any article that needs to be stored at a temperature below room temperature.

The warehouse 1 further comprises a motor-driven transfer device, for example a (partially shown) translating lift 12, which is configured so as to transfer the loading units 4 between their storage stations 3 and the stations 11a,11b; and a processing and controlling unit 13, which is configured with suitable programs concerning the handling and the storing of the articles (for example, configured so as to control the translating lift 12 and, hence, the transfer of the loading units 4 based on user commands and/or settings; so as to choose the loading unit 4 to be sent to the stations 11a,11b based on optimization strategies and based on a pre-selected order; so as to provide users with instructions or other information in the area of the stations 11a,11b; so as to monitor the state of the stock; so as to monitor the storing temperatures; etc.).

In the particular embodiment shown herein, the stations 11a,11b are recessed into the structure 2 of the warehouse 1. According to an alternative which is not shown herein, the stations 11a,11b are defined by islands projecting from the structure 2.

Each station 11a,11b comprises a fixed frame 14, which, in the particular example shown herein, is part of the structure 2 and comprises two vertical uprights 16, which are spaced apart from one another along a horizontal axis. Hereinafter, the terms "sides", "laterally", "front", "in front of", "rear", "behind", etc. relate to the point of view of the user, who is standing in front of a picking/depositing station 11a,11b while retrieving/depositing articles.

With reference to FIGS. 2-6, each station 11a,11b further comprises a seat 17 having a shape and dimensions that are such as to accommodate at least one loading unit 4. A support device 18 is provided in order to support the loading unit 4 in the seat 17. The support device 18 can be part of the translating lift 12 or define a separate element, like in the examples shown herein.

Figure 4:
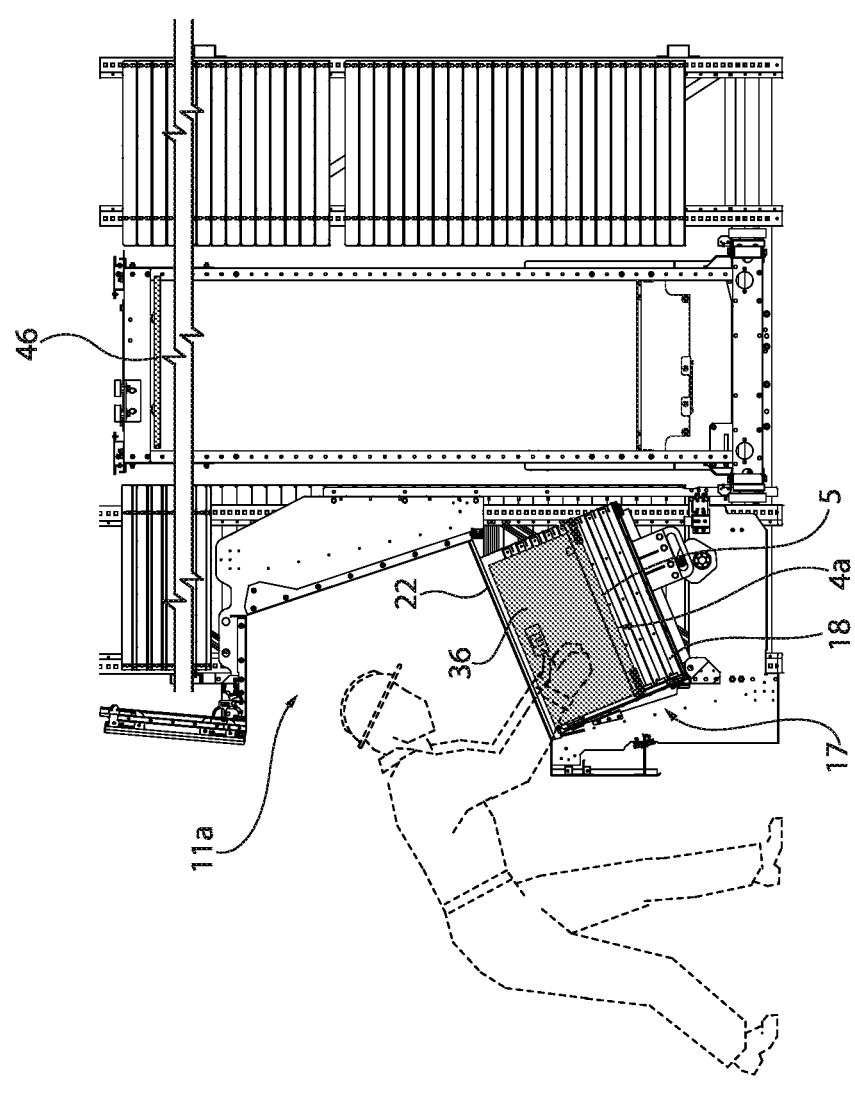

In the particular example of FIG. 4, the support device 18 can be operated by means of one or more actuators (which are not shown) in order to move the loading unit 4 when its transfer to the seat 17 has been completed. More in particular, the loading unit 4 is rotated about a horizontal oscillation axis from a horizontal position to an inclined position immediately after having entered the seat 17 and in an opposite direction immediately before being transferred again to the corresponding storage station 3. In the aforesaid horizontal position, the base 5 of the loading unit 4 is horizontal and can be horizontally translated from and to the seat 17. In the inclined position, the base 5 is at an angle other than 0° and 90°, for example ranging from 20° to 60°, relative to the horizontal position, so as to facilitate the retrieving and depositing operations manually carried out by users at the upper end of the seat 17.

In particular example shown in FIGS. 1-4, the station 11a further comprises a selective access device, also called selector and indicated by reference number 22, which is coupled to the frame 14 in a fixed position between the uprights 16 and in the area of the upper end of the seat 17, so as to close the latter from the top. The selector 22 is controlled by the unit 13 so as to only open partial and selected passages towards the loading unit 4 housed in the seat 17, depending on an authorization owned by users, so as to allow users to access the compartments and the articles for which an authorization is actually provided.

By way of example, the selector 22 is provided with rotary doors or with shutters or is provided both with doors and with shutters (for example, like in the solution of Italian patent application IT102017000089864 of 3 Aug. 2017, filed by the same Applicant) or is provided with sliding doors (for example, like in the solution of Italian patent application IT102020000000985 of 20 Jan. 2020, filed by the same Applicant and still unpublished at the priority date of this application).

Therefore, to sum up, the unit 13 controls the selector 22 so as to configure the selector 22 between a completely closed condition and a partially open condition, in which users have access to a local passage towards the seat 17, only in the space that is strictly needed to access the articles for which users are authorized.

In the preferred solution shown herein, when it closes the seat 17, the selector 22 extends along a plane that is inclined towards users relative to the horizontal direction and, in particular, is parallel to the support device 18 when the latter is rotated in the aforesaid inclined position.

With reference to FIG. 7, one or more loading units, which are indicated with reference number 4a, are powered, namely are provided with electrical connections to power and/or transmit electrical energy to user devices carried by the loading units 4a.

In particular, the loading unit 4a comprises an electrical connection interface 31 (schematically shown in FIG. 7), which is carried in a fixed position by the base 5 and/or by one of its side boards 9 and comprises an input connector 32, an output connector 33 and suitable electrical and/or electronic components (not shown herein) to transmit electrical energy from the input connector 32 to the output connector 33.

The input connector 32 is electrically connected to an electrical network of the warehouse 1 (for example, with a single-phase alternating current) when the loading unit 4*a* is arranged in a corresponding storage station 3*a*. In other words, the storage stations 3*a* are provided with respective electric terminals 34 (one of them being schematically shown in FIG. 2) to supply power: the input connector 32 is automatically disconnected from the terminal 34 in the storage station 3*a* when the loading unit 4*a* (shown with a broken line in FIG. 2) is retrieved by means of the translating lift 12, and is automatically connected again to said terminal 34 when the loading unit 4*a* is newly transferred to the storage station 3*a*.

The connection between the input connector 32 and the terminal 34 can be defined by electrical contacts (sliding contacts or male-female coupling contacts) or by electromagnetic induction (and, hence, by a connection without mechanical contact).

At the same time, the output connector 33 is defined by a female or male socket, preferably of a standard type (for example, a female "Schuko" plug), for the connection of corresponding plug of a user device.

According to an aspect of the invention, two or more user devices are defined by refrigerators 35, each comprising a container 36 having at least one compartment 37 for containing articles 38 to be preserved at a given temperature, below room temperature.

In particular, the container 36 is a distinct body relative to the loading units 4, so that it can be placed (directly or through the interposition of spacers and/or interfaces) on the base 5 of the loading unit 4*a*.

With reference to FIG. 7, again, the refrigerator 35 comprises a known cooling device 39, which is provided with an electric motor and with at least one circuit operating according to a refrigeration cycle due to the action of the motor, so as to adjust the temperature in the compartment 37 and, in particular, hold it below a desired setpoint (or, in an equivalent manner, below a given threshold). For example, the device 39 is controlled through turning-on and turning-off cycles so as to reach and maintain the set threshold, in particular through a closed loop control based on detections of temperature sensors that are not shown herein. In any case, other control strategies could be implemented (also implementing a heating of the compartment 37, for example through a heat pump, instead of a simple turning-off, in order to raise the temperature).

According to an aspect of the invention, the temperature setpoint or threshold is set by means of command signals sent remotely (for example, in a wireless mode) by a control device 40, which is separate and spaced apart from the refrigerator 35.

Preferably, the control device 40 is defined by a central electronic unit of the warehouse 1 (for example, the same unit 13 handling the orders and the stocks of the warehouse 1). Alternatively, the control device 40 is defined by at least one portable device (for example, a tablet or a mobile phone) where there is installed a suitable software to control and/or set the temperatures of the different refrigerators 35 independently of one another.

In a corresponding manner, the refrigerator 35 comprises a (schematically shown) communication device 42 having an antenna that communicates in a wireless mode (e.g. Wi-Fi or, alternatively, Bluetooth) with the control device 40 in order to send data and/or receive command signals concerning the operation of the device 39. In particular, the device 42 is configured to send data concerning temperatures of the compartment 37 and/or of the refrigeration circuit (detected by sensors that are not shown herein), receive command signals indicative of the aforesaid temperature setpoint or threshold.

The device 39 is controlled in response to said command signals, so as to reach the set temperature.

The control device 40, besides having an antenna to communicate with all devices 42, has a software with a management protocol that can identify each one of the refrigerators 35 and, hence, selectively communicate with each one of them.

Thanks to this communication system, it is possible to remotely handle each refrigerator 39 independently of the other ones and, in particular: remotely turn on and off the device 39; monitor energy consumptions; remotely carry out diagnosis of the power supply; monitor the temperatures of each refrigerator 35 for statistical or diagnostic purposes, if necessary storing said temperatures in a suitable database. More in particular, the remote monitoring of temperatures allows users to identify and signal possible operating faults and/or to optimize consumptions for the different refrigerators 35 available in the warehouse 1.

The motor of the device 39 is carried by the container 36 in a fixed position (for example, in a housing arranged, in a horizontal direction, next to the compartment 37) and is electrically powered by means of a cable 44, which ends with a plug 45 (for example, a "Schuko" plug) connected to the output connector 33. Therefore, thanks to the cable 44, which is part of the refrigerator 35, the latter is electrically connected to the loading unit 4*a*.

According to a variant, the transmission of data and/or command signals between the control device 40 and the devices 42 of the refrigerators 35 takes place by means of wiring (for example, through the interface 31 and the terminals 34).

Owing to the above, the container 36 is evidently transported together with the loading unit 4*a*, when the latter is transferred by the translating lift 12. As a consequence, the seat 17, in each station 11*a*, 11*b*, must have a height that is such as to accommodate not only the loading unit 4*a*, but also the entire container 36, if the latter projects upwards relative to the side boards 9 (like in FIG. 7).

If the warehouse 1 also uses loading units 4 without refrigerator, like in the example of FIG. 1, the support device 18 is preferably defined by a rack, which has at least two supports spaced apart from one another height-wise and defining respective guides to horizontally receive the loading units 4 from the device 12: if a refrigerator 35 is transported, the corresponding loading unit 4*a* is placed by the device 12 on the lower support; vice versa, the higher support is used.

According to an alternative which is not shown herein, the support device 18 is provided with one single support and with a height adjustment movement to adjust the position of the loading unit 4,4*a* relative to the upper end of the seat 17, based on the actual presence or lack of a refrigerator 35. In other words, if a refrigerator 35 is transferred, the support device 18 is placed in a lower position; on the other hand, if no refrigerator 35 is transferred, the support device 18 is placed in a higher position, so as to bring the side boards 9 of the loading unit 4 closer to the upper end of the seat 17.

Preferably, the container 36 is coupled to the loading unit 4*a* in a fixed relative position, for example by means of an interlocking or snapping coupling of the releasable type or by means manually operated hooking mechanisms (not show) or by means of a simple pressing insertion (with a consequent interference coupling) between two opposite side boards 9 of the loading unit 4*a*. Regardless of the type of coupling, the container 36 can be removed from the loading unit 4*a*, so that the refrigerator 35 defines a portable unit (when the plug 45 is unplugged from the output connector 33), for example for maintenance purposes. To this regard, the refrigerator 35 can be provided with handles or straps, for example connected to two opposite walls of the container 36, so that the refrigerator 35 can be transported in a simple manner.

With reference to FIG. 7, again, the refrigerator 35 further comprises at least one closing element, which is movable relative to the container 36, in order to open/close an entrance 47 of the compartment 37. In the particular example shown herein, the closing element is defined by a (partially shown) lid 46, which can be removed (namely, uncoupled and moved away) from the container 36. According to variants which are not shown herein, the closing element remains coupled to the container 36 even when it is open and can be defined, for example, by a bellows closing or by a sliding shutter.

According to a preferred aspect of the invention, the entrance 47 is defined by an annular upper edge of the container 36, so that the compartment 37 can only be accessed from above (and not at the front or from the sides). In other words, the container 36 is placed on the loading unit 4*a* in such a way that the entrance 47 faces upwards, namely away from the base 5.

In particular, the lid 46 comprises an upper portion 49 and a lower portion 50, which projects from the portion 49 and engages the entrance 47. The seal of the compartment 37 is ensured by a gasket arranged along the perimeter of the entrance 47 or of the lid 46.

Figure 2:
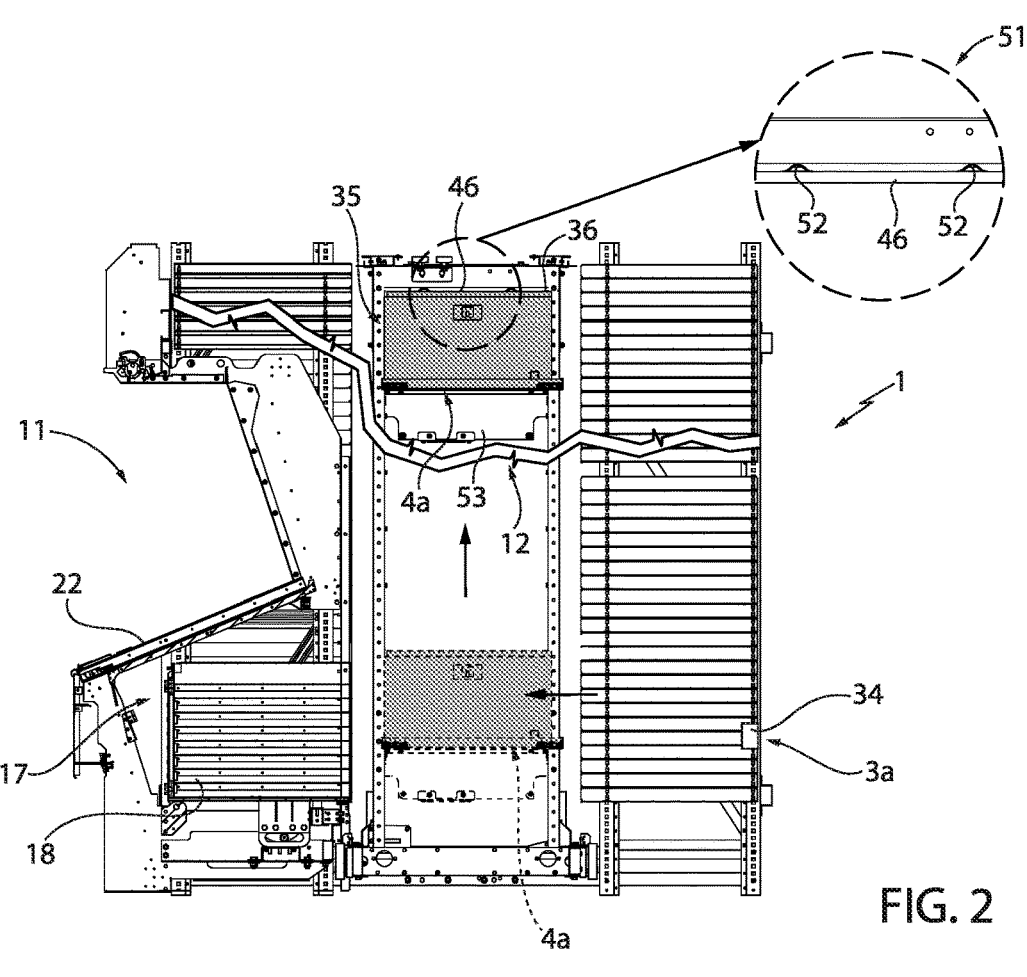
FIGS. 2 to 4 show, in a sectional view and in a schematic manner, a sequence of operations to move a loading unit, which is provided with a refrigerator, from a storing station to a picking/depositing station of the warehouse of FIG. 1.

With reference to FIG. 2, the warehouse 1 preferably comprises an opening/closing assembly 51, which is controlled by the unit 13 so as to automatically open the compartment 37 when the loading unit 4*a* is transferred to the station 11*a* and to then automatically close the entrance 47 when the loading unit 4*a* is moved back to the storage station 3*a*.

The assembly 51 comprises at least one (schematically shown) gripping member 52, which can be operated so as to take hold of and release the lid 46, and at least one movement member 53, which can be operated so as to move the gripping member 52 and the loading unit 4*a* close to and away from one another, when the lid 46 is gripped by the gripping member 52.

Figure 3:
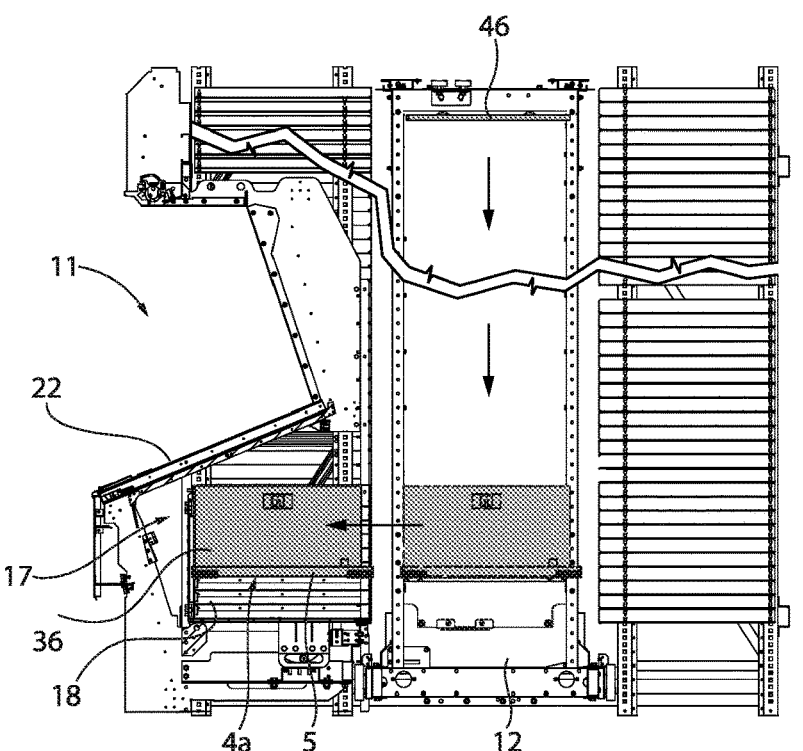

In the embodiment of FIGS. 2-4, the assembly 51 is arranged in an intermediate position between the storage stations 3*a* and the station 11*a*. In particular, the movement member 53 is part of the translating lift 12, whereas the gripping member 52 is arranged in an elevator compartment 54, which is used by the translating lift 12 to transfer the loading units 4.

In use, the translating lift 12 is operated by the unit 13 so as to retrieve a loading unit 4*a*, horizontally carrying it in the elevator compartment 54, and then vertically transport the loading unit 4*a* up to the gripping member 52 (FIG. 2). After having had the gripping member 52 take hold of the lid 46, the translating elevator 12 is operated so as to translate downwards up to the height of the station 11*a* (FIG. 3): during this downward transfer, the lid 46 is automatically detached from the container 36, thus opening the compartment 37. At this point, the loading unit 4*a* is horizontally transferred to the seat 17 and, if necessary, is inclined towards users (FIG. 4). Finally, the selector 22 is operated by the unit 13 so as to open a passage and allow users to retrieve or deposit the articles 38.

Figure 5:
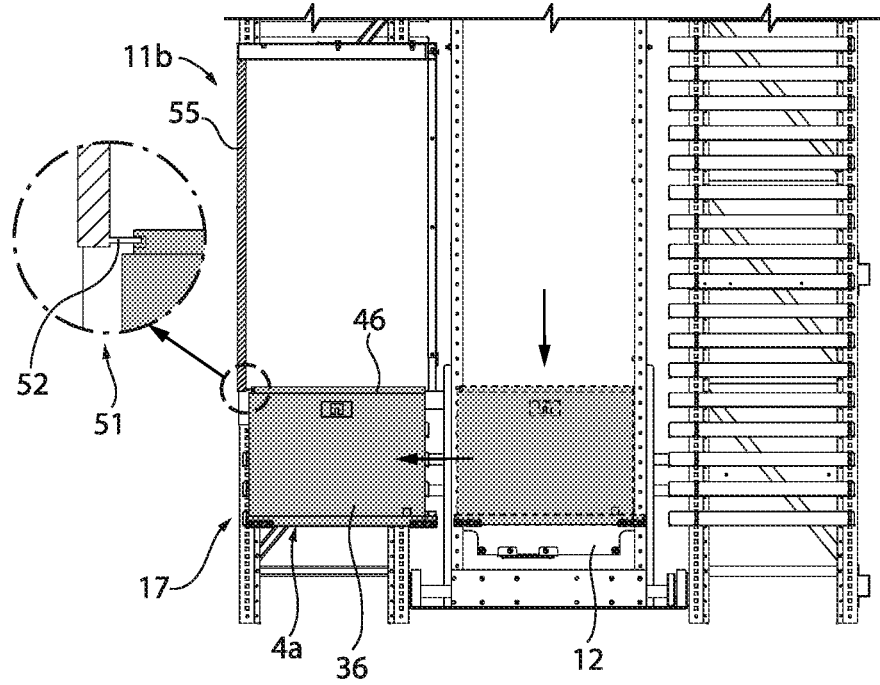
FIGS. 5 and 6 are similar to FIGS. 3 and 4 and show the movement of the loading unit to a different picking/depositing station.
Figure 6:
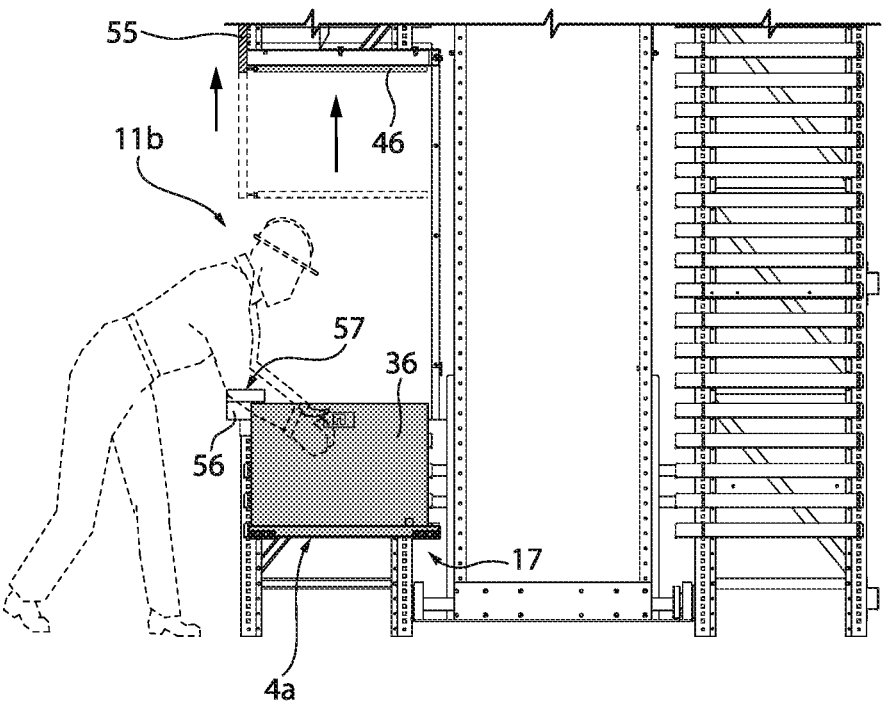

In the station 11*b* visible in FIGS. 5 and 6, the selector 22 is absent. At the same time, the station 11*b* has a motor-driven bulkhead 55, which can be moved, on command of the unit 13, between a closed position, in which it defines a barrier to forbid any access to the loading unit 4 accommodated in the seat 17, and an open position, in which it allows users access. In particular, the bulkhead 55 is vertical when it is closed.

In this specific case, the assembly 51 is arranged in the station 11*b*: preferably, the gripping member 52 is carried by the bulkhead 55 (for example, by a lower end of its), whereas the movement member 53 is defined by the bulkhead 55 itself.

In use, the translating lift 12 is operated by the unit 13 so as to transfer the loading unit 4*a* from the storage station 3*a* to the station 11*b*, while the bulkhead 55 is closed (FIG. 5). Here, the gripping member 52 is caused to take hold of the lid 46. After that, the bulkhead 55 is opened (FIG. 6): during this opening movement, the gripping member 52 moves away from the seat 17 and, hence, from the loading unit 4*a*, together with the bulkhead 55, so that the lid 46 automatically moves away from the container 36. At this point, users can access the compartment 37.

Preferably, the station 11*b* comprises a least one (schematically shown) safety element 56, which defines a blocking shoulder 57 having a position and dimensions that are such that it vertically faces an edge of the container 36, so as to prevent the latter from being (accidentally or unintentionally) moved away from the loading unit 4*a*, which is arranged in the seat 17. The safety element 56 could be releasable or capable of being uncoupled, so as to carry out maintenance operations or replace the refrigerators 35.

The operations for closing the compartment 37 are carried out in reverse order relative to what described above, which is why said operations are not described in detail.

According to a variant which is not shown herein, the closing element of the refrigerator 35 is directly opened and closed by users in the station 11*b*, so that the warehouse 1 can lack the assembly 51.

When the loading unit 4*a* is moved away from the station 3*a* (and is transferred to the station 11*a* or 11*b*), the refrigerator 35 is not powered and it is turned off for the entire time needed for transfer and retrieving/depositing operations. According to a variant which is not shown herein, the loading unit 4*a* comprises a rechargeable backup battery, for example interposed between the input connector 32 and the output connector 33, to supply power to the refrigerator 35 in case the input connector 32 fails to supply power.

With reference to the example shown in FIG. 7, the refrigerator 35 comprises a separating partition 60 arranged in the container 36 so as to separate, from one another, at least two compartments 37, which are refrigerated by means of the device 39. According to a particular embodiment, the compartments 37 are refrigerated and controlled independently of one another, for example through respective refrigeration circuits of the device 39, so as to reach different temperatures.

According to a preferred aspect of the invention, the partition 60 is a separate piece and can be removed form the container 36, even though it is placed in a fixed position inside the latter, so that the inner space can be configured in different ways. For example, the container 36 is provided with vertical inner grooves 61, which are designed to be engaged by the end edges of the partition 60. In this way, the partition 60 can be moved, thus changing the dimensions of the compartments 37, or it can be replaced by another separator, so as to form a different number of compartments 37 and/or change their width and/or shape. By mere way of example, FIG. 8 shows a separator 62 that constitutes the partition 60 and leads to the formation of compartments that have ideal dimensions for accommodating bottles.

Preferably, in the configurations in which the inner space of the container 36 is divided into two or more compartments 37, the selector 22 is configured and/or controlled so as to selectively allow access to the sole compartment (or compartments) 37 for which users have an authorization (similarly to what happens with the compartments 10), after the loading unit 4a has been transferred to the station 11a and the entrance 47 has been opened.

The solution of FIG. 9 shows some possible variants for the loading unit 4a and/or for the refrigerator 35: the side boards 9 of the loading unit 4a can be higher than they are in the other figures and reach, for example, the same height as the refrigerator 35; the partition 60 can be firmly fixed to or be one single piece together with the container 36; and/or the refrigerator can be provided with at least two closing elements (namely, two lids 46), which are opened and closed independently of one another, each for a respective compartment 37; and/or the loading unit 4a can have at least two compartments 10, one of them being engaged by the refrigerator 35, whereas the other one is not provided with a refrigerator and can be used to store articles that do not need to be cooled in order to be preserved.

Owing to the above, the solution described and claimed herein evidently leads to a high handling flexibility, thanks to the control device 40, which remotely monitors and controls the refrigerators 35 (preferably, in wireless mode). Indeed, the monitoring carried out by the control device 40 makes sure that the products are preserved at the required temperature over time; it allows possible faults (malfunctions, halts and/or difficulties in maintaining the required temperature setpoint, for example due to errors in the closing of the lids 46, etc.) to be promptly signalled; and/or it allows for an optimization of the turning-on/tuning-off cycles of the devices 39 of the different refrigerators 35 in the warehouse 1, in particular in order to minimize energy consumption, for example depending on the programmed or expected time the articles 38 will remain in the warehouse 1.

Furthermore, a large number of cells can be controlled/adjusted at different temperatures, each defined by a respective refrigerator 35, in a centralized manner. The refrigerators 35 can freely and independently be programmed depending on application needs, so that the same warehouse 1 can accommodate different product categories, each with its own specific requirements in terms of storage temperature.

Furthermore, the warehouse 1 is also flexible in terms of manufacturing and configuration thereof.

Indeed, loading units 4 that are already being produced can be used, without having to design new ones, and refrigerators that are normally available in the market can be installed, since said refrigerators 35 are distinct from the loading units 4. In particular, the refrigerators 35 can be placed on the bases 5 depending on the actual quantity of products to be stored at a controlled temperature, whereas the structural and dimensional features of the loading units 4 and of the storage stations 3 remain unchanged. The necessary adjustments are relatively small: they simply entail installing the interfaces 31 and the terminals 34, besides providing possible measures to hold the refrigerators 35 in a fixed, though removable position on the bases 5.

The solution offered herein is flexible also because its configuration can be changed over time, both in terms of number of refrigerators 35 (removing or adding them, based on the needs, on loading units 4a already available in the warehouse 1) and, if necessary, in terms of number of compartments 37 in which the inner space of each refrigerator 35 is divided.

If necessary, an already existing solution can be transformed so as to allow it to have the features of the warehouse 1 (without changing the loading units, the picking/depositing stations and the structure where the storage stations are located).

Furthermore, the structure 2 and/or the loading units 4 do not require thermal insulation measures, since the insulation is solely assigned to the walls of the container 36 and to the lid 46.

Furthermore, compared to known solutions in which the entire environment of the warehouse 1 has to be conditioned, the warehouse 1 has a smaller system-related complexity and consumes a smaller quantity of energy.

The selector 22, if present, can be used in a particularly advantageous manner, for example to handle the deliveries of the articles 38, since the selector 22 can be configured so as to only make available those compartments 37 of the refrigerator 35 for which users actually have an authorization. In other words, the same refrigerator 35 can be used to store products that are assigned to different users, without the risk of retrieving articles that are assigned to another user.

Finally, owing to the above, it is evident that the warehouse 1 described above, with reference to the accompanying drawings, can be subjected to changes and variants, without for this reason going beyond the scope of protection of the invention as set forth in a appended claims.

In particular, the communication system between the control device 40 and the refrigerators 35 could be applied to solutions in which the refrigerators 35 are integrated with the loading units, namely they define themselves respective loading units especially designed and built to be directly interfaced with the structure 4 and with the terminals 34 of the electrical network.

Furthermore, the warehouse 1 can advantageously be used to pick up groceries bought on-line, but it also applies to other fields (for example, to the pharmaceutical industry).

Furthermore, the assembly 51 for the automatic removal of the lid 46 can completely be integrated in the translating lift 12 and be operated during the transfer of the loading units 4a; or it can be arranged in the area of each storage station 3a or at the entry of the seat 17; or it can be arranged in at least one dedicated cell, where the loading unit 4a is caused to transit, during the transfers from and to the station 11a,11b.

Furthermore, the environment on the inside of the warehouse 1 could be conditioned in order to adjust its temperature independently of the adjustment carried out inside each refrigerator 35.

The invention claimed is:

1. An automated warehouse comprising:
  a plurality of loading units, at least two of which are powered loading units powered by an electrical network of the warehouse and provided with respective refrigerators, each refrigerator comprising:
    a) a container having at least one compartment including and entrance for containing articles, b) a cooling device for adjusting the temperature of said compartment;

c) at least one movable closing element for opening/closing the entrance of said compartment; and d) a communication device for sending data and/or receiving command signals;

a plurality of storage stations, each designed to house a respective loading unit;

at least one picking/depositing station comprising a seat designed to house at least one loading unit accessible by a user, at least in certain operating conditions, to pick/deposit articles;

a movement device to transfer the loading units between said storage stations and said seat; and a control device separated from said refrigerators and configured to communicate remotely with the communication devices of said refrigerators, to receive data relative to the operation of each said refrigerator and/or to send command signals to operate each of said cooling devices;

wherein the container of each said refrigerator is a distinct body with respect to, and arranged on, the corresponding powered loading unit for being transported therewith and to be removable from the corresponding powered loading unit; and wherein the cooling device of each said refrigerator is electrically connected to the corresponding powered loading unit.

2. The warehouse according to claim 1, wherein at least one of said powered loading units comprises a section engaged by a corresponding one of the refrigerators, and a further section without a refrigerator for containing articles at room temperature.

3. The warehouse according to claim 1, wherein said entrance is facing upwards.

4. The warehouse according to claim 3, wherein said closing element is defined by a lid, removable from said container.

5. An automated warehouse comprising:

a plurality of loading units, at least two of which are provided with respective refrigerators, each refrigerator comprising:

a) a container having at least one compartment for containing articles, b) a cooling device for adjusting the temperature of said compartment;

c) at least one movable closing element for opening/closing an entrance of said compartment; and d) a communication device for sending data and/or receiving command signals;

a plurality of storage stations, each designed to house a respective loading unit;

at least one picking/depositing station comprising a seat designed to house at least one loading unit accessible by a user, at least in certain operating conditions, to pick/deposit articles, wherein said picking/depositing station comprises a bulkhead, movable between a closed position and an open position, in which the user is respectively prevented from accessing and allowed to access said seat;

a movement device to transfer the loading units between said storage stations and said seat, a control device separated from said refrigerators and configured to communicate remotely with the communication devices of said refrigerators, to receive data relative to the operation of each said refrigerator and/or to send command signals to operate each of said cooling devices: and an opening/closing assembly operated to automatically open and close said compartment, wherein said opening/closing assembly is arranged in said picking/depositing station and the opening/closing assembly comprises at least one gripping member, carried by said bulkhead and operated to grip/release said closing element when the bulkhead is arranged in the closed position.

6. The warehouse according to claim 5, wherein said opening/closing assembly comprises a movement member that forms part of said movement device.

7. The warehouse according to claim 1, wherein said refrigerator comprises a partition arranged in said container to form at least two distinct compartments, said partition being removable from said container.

8. An automated warehouse comprising:

plurality of loading units, at least two of which are provided with respective refrigerators, each refrigerator comprising:

a) a container for containing articles and a separating partition arranged in said container to form at least two distinct compartments;

b) a cooling device for adjusting the temperature of said at least two distinct compartments, said cooling device being configured to cool said two distinct compartments at different temperatures from one another;

c) at least one movable closing element for opening/closing an entrance of said compartment; and d) a communication device for sending data and/or receiving command signals;

a plurality of storage stations, each designed to house a respective loading units at least one picking/depositing station comprising a seat designed to house at least one loading unit and which can be accessed by a user, at least in certain operating conditions, to pick/deposit articles;

a movement device to transfer the loading units between said storage stations and said seat; and a control device separated from said refrigerator and configured to communicate remotely with the communication devices of said refrigerators, to receive data relative to the operation of each said refrigerator and/or to send command signals to operate each of said cooling devices.

9. The warehouse according to claim 1, wherein said refrigerator comprises a separating partition arranged in said container to form at least two distinct compartments; and wherein said picking/depositing station comprises a selective access device that closes said seat and is configured to open a passage towards the one and/or the other of said compartments as a function of an authorisation belonging to the user.

10. The warehouse according to claim 1, wherein said picking/depositing station comprises at least one safety element arranged in a fixed position and defining a blocking shoulder having position and size such as to be facing, in use, towards an edge of said container to prevent the removal thereof when it is arranged in said seat.

11. The warehouse according to claim 1, wherein each said communication device and said control device are configured to communicate wirelessly between one another.

* * * * *